June 2, 1931. P. LA F. MAGILL 1,807,924
PROCESS FOR RECTIFYING AND TREATING HYDROCARBON VAPORS
Filed Nov. 25, 1927
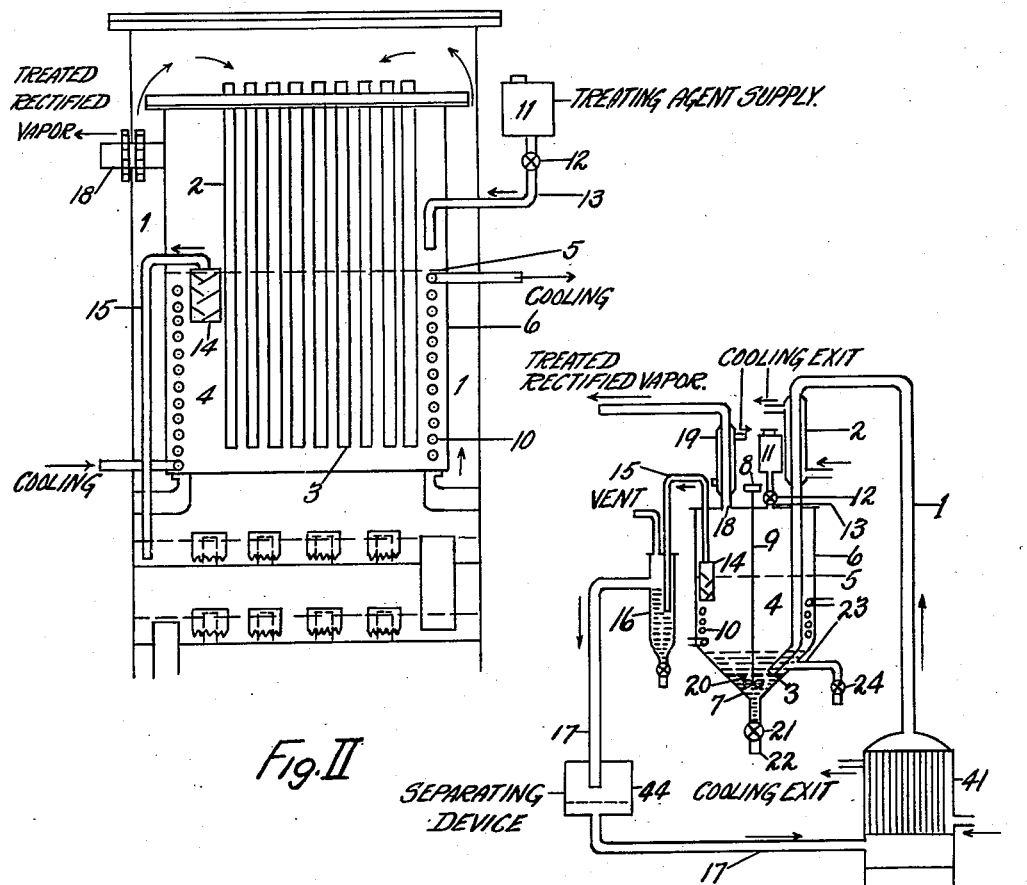
INVENTOR
Paul L. Magill,
BY
ATTORNEY Patented June 2, 1931

1,807,924

UNITED STATES PATENT OFFICE

PAUL LA FRONE MAGILL, OF NIAGARA FALLS, NEW YORK, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS FOR RECTIFYING AND TREATING HYDROCARBON VAPORS

Application filed November 25, 1927. Serial No. 235,491.

This invention relates to the treatment of vapors and especially hydrocarbon vapors. These hydrocarbons may be obtained from any source, such as the distillation of crude petroleum, cracking of hydrocarbons, hydrogenation of coal, distillation or extraction of oil shale, casing head gasoline, etc. This invention is applicable to individual hydrocarbons as well as to mixtures.

These untreated products are usually undesirable for use because of the presence of substances such as certain sulphur compounds and unstable hydrocarbons which have an unpleasant odor, which resinify on standing, etc. Thus in gasoline for motor use the quantity of these undesirables must be reduced to render the product stable and saleable. In the succeeding specification my invention will be particularly described with reference to what is commonly known as gasoline, but I do not wish to be limited thereto since the invention is applicable to the treatment of hydrocarbons in general.

The treating of crude gasoline usually results in the formation of certain solid and liquid by-products which may be polymers of unsaturated compounds in the gasoline or may be compounds of the treating agent with certain constituents of the gasoline, or both. In general, such by-products are troublesome since they tend to foul the treating apparatus and the treating agent. In many cases it is necessary for economic reasons to recover the treating agent from its mixture with the by-products; this, of course, adds an extra operation, and may be attended with considerable difficulty and expense. This prohibits the use of relatively expensive treating agents even though they produce a superior product. Thus, for example, such difficulties form one of the principal reasons why alkali metals have not been used to any great extent commercially in treating crude gasolines even though it is known that the treated product is of excellent quality.

Gasolines of high quality can be produced by contacting crude gasoline vapors with a treating medium consisting of alkali metal in liquid hydrocarbon, removing a part of the treated gasoline as vapors and part as liquid, the latter serving to remove the treatment by-products, in solution, in suspension or both. The liquid portion can then be treated by such processes as distillation for recovery of its gasoline content.

The object of this invention is to provide a process for treating hydrocarbons comprising rectifying hydrocarbon vapors and passing the rectified vapors without their having undergone sufficient condensation to provide sufficient refluxing liquid for rectification, into a treating medium comprising alkali metal in liquid hydrocarbon, and condensing a portion of these vapors therein. The amount thus condensed must be sufficient to furnish liquid medium, to remove treatment by-products and, when returned to the rectifier, to compensate for the insufficient reflux liquid. The finished product is removed from the treating medium as vapors. The treatment by-products are carried from the treating vessel by the condensate above referred to and pass downward in the rectifier with the reflux liquid and are removed with the liquid effluent from the rectifier.

In this specification I speak of a "suspension" of the treating agent in liquid, but I do not wish to be limited to the physical condition of the medium that this may imply. I do not know whether the success and particular efficacy of my method in producing excellent products is due to the contact with undissolved agent in the liquid or to contact with dissolved agent. It is even possible that some reaction product of the agent and a component of the liquid, or that certain substances produced by the treating process and included in the term "polymer" or "by-product" as used herein, may either in solution or suspension, or both, contribute to the success of the process. In any event I intend the expressions "treating agent in a liquid" "treating agent in liquid hydrocarbon" or "suspension in a liquid," etc., to cover all these possible physical conditions. By "treating medium" herein is meant the mixture of liquid and treating agent.

The figures illustrate two forms of apparatus suited for applying the principles of this invention.

Figure I is a diagrammatic sketch illustrating one way in which my process can be applied to hydrocarbon vapors from any source, for example from a cracking process.

Figure II illustrates a specific combination of distilling column and treating vessel.

My invention will be further explained with reference to the attached drawings. Thus, in Figure I, lower boiling hydrocarbons consisting of those fractions commonly designated as gasoline and kerosene together with any "wild," i. e., still more volatile gases are passed by way of pipe 38 into a distilling column 39 at a suitable point, 40. The column is provided with a reflux condenser, 41, and with a heating coil 42.

The hydrocarbon vapors coming from the distilling column are introduced through the pipe 1, which may carry a condenser 2, through the opening 3, into the treating medium 4, with level at 5, and contained in a vessel or reactor 6. The vessel may be equipped with an agitator 7, driven by the pulley 8 through the shaft 9. The agitator may, under certain conditions, be omitted, the agitation being supplied by the vapors entering the treating medium. The vessel may be equipped with a jacket or a coil 10, which may be used either for heating or for cooling. Hopper 11 serves for introducing alkali metal into the treating medium through the valve 12 and pipe 13.

A fraction, depending upon the treating temperature, of the hydrocarbon vapors entering the vessel 6 is condensed. This condensed fraction leaves as liquid through a baffle separator 14 and pipe 15, and by a device such as 16, an approximately constant level 5 of the medium is maintained. This liquid is run through pipe 17 into one of the upper sections of the distilling column 39.

The larger portion of the hydrocarbon vapors entering the treating vessel leaves the latter as vapor through the pipe 18, which may be equipped with a fractional condenser 19 to condense out, if desired, any higher boiling constituents. From the fractional condenser the vapors are led to any well known recovery system, not shown here.

Exchanger 2 has been referred to as a condenser. Both 2 and the coil 10 can be used either as coolers or as heaters and their purpose is to assist in maintaining the desired treating temperature.

The liquid leaving the reactor by way of separator 14 and pipe 15 consists of the heavier ends, that is, the higher boiling constituents of the gasolines or hydrocarbons treated. This liquid carries with it the by-products formed in the reactor during the treatment.

Inasmuch as the alkali metals are relatively light it is advisable to provide a separator, e. g., a system of baffles as at 14, which will permit effective separation of the alkali metal from the liquid effluent.

The alkali metal can be fed to the reactor in any convenient manner. It may be prepared as a suspension in liquid hydrocarbon and the suspension added to the reactor by way of hopper 11 or the metal may be added in solid form such as bricks and agitation in the reactor will serve to subdivide it on melting. The metal might be added as a liquid or as a finely divided metal in suspension. Other methods may be applied by those skilled in handling such materials.

The percentage of the hydrocarbons fed to the treating apparatus which leaves the reactor as liquid is regulated, in general, according to the amount of by-products formed. Enough must be condensed to carry away the by-products at a satisfactory rate.

In many cases the quality of the hydrocarbons produced by this treatment is satisfactory over a wide treatment temperature range and therefore we prefer to regulate the temperature of operation so that a sufficient quantity of the hydrocarbons is condensed to keep the treating medium in satisfactory operating condition and to provide the desired quantity of reflux liquid in the column.

In certain cases operation may be switched at intervals to a spare treating unit similar to reactor 6. Since the alkali metals (except lithium) settle more rapidly than the polymer, a large part of the alkali metal, 20, collects in the lower end of the conical bottom of the reactor and may be drawn off by valve 21 and pipe 22. Or, since the bulk of the polymer which is suspended in the medium settles down just above the alkali metal most of it can be removed, along with a portion of the liquid medium, thru the pipe 23 and valve 24, after which the treating vessel is ready for further use.

A great variation in the concentration of alkali metal in the treating medium is possible. For example, certain cracked gasolines have been successfully refined with as little as 2 grams of sodium per liter of treating medium. As far as quality of product is concerned there is no upper limit of alkali metal concentration. Other things being equal the rate of treatment will depend on the state of subdivision of the treating agent.

It is possible that certain substances produced by the treating process and included in the term "by-products" as it is used herein, may, either in solution or merely in suspension, contribute to the success of the treating process.

The effluent from the vessel 6 flows through pipe 17 into one of the upper sections of the distilling column to furnish part or all of the reflux liquid necessary for the rectifying action of the column. In flowing downward this liquid carries with it the by-products formed by the treatment which finally leave the column with the higher boiling hydrocarbons by way of pipe 43.

These high boiling hydrocarbons may be freed from the treatment by-products if desired by such processes as settling, filtering, centrifuging or other separating processes and can be disposed of in any convenient way; for example, they can be cracked. If desired, the treatment by-products can be removed from the liquid leaving the treating vessel 6 by one of the above separating processes as shown at 44 and the liquid then introduced into the column as described above.

In general, in a rectifying column the condenser 41 must supply by condensation all of the reflux liquid necessary for operation. According to my process the reflux condenser 41 may be used to supply all of the reflux liquid necessary for normal rectification in which case the liquid entering the column through pipe 17 is more or less surplus and in order to expel it from the column as vapor a correspondingly greater quantity of heat must be supplied by heating coil 42. It is preferable, however, to supply less cooling to condenser 41 so that only a part of the necessary reflux is supplied and the remainder then furnished by the liquid entering through pipe 17, thus using treating vessel 6 as a reflux condenser. It is evident that the reflux load can be shared in any proportion between the condenser 41 and the treating vessel 6. Indeed, the condenser 41 may be dispensed with entirely and all of the reflux liquid obtained by condensation in treating vessel 6. An advantage of this latter arrangement is that more liquid is available for removing treatment by-products from the treating medium in vessel 6.

Figure 1 shows the treating vessel 6 as located higher than the distilling column and the effluent from the treating vessel returned to the column by gravity. In practice it may be desirable to locate vessel 6 near the ground and to introduce the effluent into the upper part of the column by a circulating means such as a pump.

Figure 2 illustrates another method of accomplishing the objects of this invention. It shows the upper distilling sections of a column in combination with a vessel containing treating medium, the vessel being built into the top of the column. In general this treating vessel functions in the same way as vessel 6 in Figure 1. Thus, in this case the vapors from the column pass through the annular space 1 and, as indicated by the arrows, flow downward through the tubes 2, entering by way of tube openings 3, into the treating medium 4 with level at 5 and contained in vessel 6. Coil 10 furnishes the necessary cooling, which in this case must be sufficient to produce all of the required reflux liquid. Alkali metal can be introduced into the medium from vessel 11 through valve 12 and pipe 13. The liquid effluent leaving the vessel 6 by way of baffle separator 14 and pipe 15 is discharged preferably below the liquid level on the top plate of the column as shown. The treatment by-products travel downward in the column and are removed with the higher boiling liquid effluent. The treated and rectified hydrocarbon vapors leave the column by 18 and are recovered in the usual way.

In order to avoid ambiguity and a multiplicity of claims, definitions of the terms used in the claims and specifications are here given: The term "alkali metal" covers these metals, i. e., sodium, potassium, etc., singly or in various combinations or mixtures with each other or with other metals such as calcium, magnesium, mercury, lead, tin, etc. The term "by-products" covers all of the substances that are formed in the treating medium and that are not removed with the treated hydrocarbon vapors leaving the treating vessel. The term "hydrocarbons" stands for mineral oils, gasolines, and any other hydrocarbon materials that may be improved by such treatment as herein described. The term "reflux liquid" covers the liquid component in any type of rectifier traveling counter current to the flow of vapor.

Claims:

1. The process comprising passing hydrocarbon vapors from a rectifier into contact with a treating medium consisting of alkali metal in liquid hydrocarbon, removing part of the treated hydrocarbons as vapor condensing a portion of treated hydro carbon and washing therewith contaminating by-products from the surface of unreacted alkali metal; retaining unreacted alkali metal within the treating vessel; separating the by-products therefrom and from the treating vessel by floating off said by-products in liquid hydrocarbon and discharging before undesirable quantities accumulate and passing the liquid into the upper portion of said rectifier to serve as reflux liquid.

2. The process comprising passing hydrocarbon vapors from a rectifier into contact with a treating medium consisting of sodium in liquid hydrocarbon, removing part of the treated hydrocarbons as vapor condensing a portion of treated hydrocarbon and washing therewith contaminating by-products from the surface of unreacted alkali metal; retaining unreacted alkali metal within the treating vessel; separating the by-products therefrom and from the treating vessel by floating off said by-products in liquid hydrocarbon and discharging before undesirable quantities accumulate and passing the liquid into the upper portion of said rectifier to serve as reflux liquid.

3. The process comprising passing hydrocarbon vapors from a distilling column into contact with a treating medium consisting of alkali metal in liquid hydrocarbon in a treating zone apart from the rectifying zone, removing part of the treated hydrocarbons as vapor and part as liquid, said liquid serving to remove treatment by-products from the treating vessel and passing said liquid into the upper part of said distilling column to serve as reflux liquid.

4. The process comprising passing hydrocarbon vapors from a rectifier into contact with a treating medium consisting of alkali metal in liquid hydrocarbon, removing part of the treated hydrocarbons as vapor and condensing a part in said medium, separating treating agent from a portion of the liquid hydrocarbon, flowing said portion from the treating vessel and removing therewith polymer formed and passing said liquid into the upper part of said rectifier to serve as reflux liquid.

5. The process comprising passing hydrocarbon vapors from a rectifier into contact with a treating medium consisting of alkali metal in liquid hydrocarbon, removing part of the treated hydrocarbons as vapor and part as liquid freed of alkali metal and passing the latter into the upper portion of said rectifier to serve as reflux liquid and removing treatment by-products with the higher-boiling liquid hydrocarbons discharged from said distilling column.

6. The process comprising passing hydrocarbon vapors from a rectifier into contact with a treating medium consisting of sodium in liquid hydrocarbon, removing part of the treated hydrocarbons as vapor and part as liquid freed of alkali metal and passing the latter into the upper portion of said rectifier to serve as reflux liquid and removing treatment by-products with the higher-boiling liquid hydrocarbons discharged from said distilling column.

7. The process comprising passing hydrocarbon vapors from a distilling column into contact with a treating medium consisting of alkali metal in liquid hydrocarbon, removing part of the treated hydrocarbons as vapor condensing a part, separating alkali metal from a portion of the liquid, flowing said portion from said vessel and removing suspended polymer therewith, passing said liquid into the upper part of said distilling column to serve as reflux liquid and removing treatment by-products with the higher-boiling liquid hydrocarbons discharged from said distilling column.

8. The process comprising passing hydrocarbon vapors from a distilling column into contact with a treating medium consisting of alkali metal in liquid hydrocarbon, removing part of the treated hydrocarbons as vapor condensing a portion of treated hydrocarbon and washing therewith contaminating by-products from the surface of unreacted alkali metal; retaining unreacted alkali metal within the treating vessel; separating the by-products therefrom and from the treating vessel by floating off said by-products in liquid hydrocarbon and discharging before undesirable quantities accumulate, said liquid serving to remove treatment by-products from the treating vessel and passing said liquid into the upper part of said distilling column to serve as reflux liquid and removing treatment by-products with the higher-boiling liquid hydrocarbons discharged from said distilling column and separating treatment by-products from said higher-boiling liquid hydrocarbons.

9. Process of treating hydrocarbons consisting in preparing a suspension of treating agent in hydrocarbons not reactive therewith, passing hydrocarbon vapors from a rectifying column into said suspension with agitation and thereby forming solid polymer therein, removing a part of the treated vapor, condensing the remaining part of said vapor in the suspending hydrocarbon, separating treating agent from a portion of the suspending medium containing polymer, flowing said separated hydrocarbon with suspended polymer from the treating vessel without removing therewith treating agent, separating polymer from the liquid, and passing this effluent liquid into the upper portion of said rectifying column to serve as reflux liquid.

10. Process of treating hydrocarbons consisting in preparing a suspension of alkali metal in a hydrocarbon suspending medium not reactive therewith, passing vapors of the hydrocarbon to be treated through said suspension with agitation and thereby forming polymer therein and treating the vapors, condensing a portion of said vapors within said suspending medium, continuously flowing off without discharging alkali metal such proportion of the suspending medium with polymer suspended therein as to maintain low concentration of polymer in the suspension to prevent the coating of the alkali metal, passing said outflowing suspending medium into a rectifying tower to supply reflux liquid therefor, discharging said polymer with the heavy ends of said reflux from said rectifier, leading vapors from said rectifier to said suspension for treatment, and recovering the uncondensed portion of said vapors.

Signed at Niagara Falls, in the county of Niagara and State of New York, this 19th day of November, A. D. 1927.

PAUL L. MAGILL.